United States Patent [19]

Saito et al.

[11] Patent Number: 5,176,724
[45] Date of Patent: Jan. 5, 1993

[54] PERMSELECTIVE COMPOSITE MEMBRANE HAVING IMPROVED GAS PERMEABILITY AND SELECTIVITY

[75] Inventors: Yukihiro Saito, Kawasaki; Shiro Asakawa, Tokyo; Katsunori Waragai, Kawasaki; Midori Seki, Tokyo, all of Japan

[73] Assignee: Matsushita Electric Industrial Co., Ltd., Japan

[21] Appl. No.: 753,020

[22] Filed: Aug. 26, 1991

Related U.S. Application Data

[63] Continuation of Ser. No. 269,172, Nov. 9, 1988, abandoned.

[30] Foreign Application Priority Data

Nov. 10, 1987 [JP] Japan .................. 62-283533
Nov. 30, 1987 [JP] Japan .................. 62-302201

[51] Int. Cl.$^5$ ............................................. B01D 53/22
[52] U.S. Cl. ............................................. 55/158; 55/524
[58] Field of Search .................... 55/16, 68, 158, 524

[56] References Cited

U.S. PATENT DOCUMENTS

| 4,393,113 | 7/1983 | Sugie et al. ............... 55/158 X |
| 4,591,440 | 5/1986 | Higashimura et al. ...... 55/158 X |
| 4,689,267 | 8/1987 | Takamizawa et al. ...... 55/158 X |
| 4,714,481 | 12/1987 | Matsuura et al. ........... 55/158 |
| 4,746,334 | 5/1988 | Matsui et al. ............... 55/158 |
| 4,755,193 | 7/1988 | Higashimura et al. ...... 55/16 |

FOREIGN PATENT DOCUMENTS

| 0181850 | 5/1986 | European Pat. Off. ...... 55/158 |
| 58-055007 | 4/1983 | Japan ........................... 55/158 |
| 59-010305 | 1/1984 | Japan ........................... 55/158 |
| 59-042004 | 3/1984 | Japan ........................... 55/158 |
| 59-059211 | 4/1984 | Japan ........................... 55/158 |
| 60-012104 | 1/1985 | Japan ........................... 55/158 |
| 60-132605 | 7/1985 | Japan ........................... 55/158 |
| 60-227804 | 11/1985 | Japan ........................... 55/158 |
| 61-015718 | 1/1986 | Japan ........................... 55/158 |
| 61-035803 | 2/1986 | Japan ........................... 55/158 |
| 61-107922 | 5/1986 | Japan ........................... 55/158 |
| 61-129008 | 6/1986 | Japan ........................... 55/158 |
| 61-146321 | 7/1986 | Japan ........................... 55/158 |
| 61-161120 | 7/1986 | Japan ........................... 55/158 |
| 61-192322 | 8/1986 | Japan ........................... 55/158 |
| 62-268745 | 11/1986 | Japan ........................... 55/158 |
| 62-033526 | 2/1987 | Japan ........................... 55/158 |
| 62-079831 | 4/1987 | Japan ........................... 55/158 |
| 62-110730 | 5/1987 | Japan ........................... 55/158 |
| 62-186922 | 8/1987 | Japan ........................... 55/158 |
| 62-286518 | 12/1987 | Japan ........................... 55/158 |
| 63-001421 | 1/1988 | Japan ........................... 55/158 |
| 63-080826 | 4/1988 | Japan ........................... 55/158 |
| 63-126524 | 5/1988 | Japan ........................... 55/158 |
| 2182581 | 5/1987 | United Kingdom .......... 55/158 |

*Primary Examiner*—Robert Spitzer
*Attorney, Agent, or Firm*—Lowe, Price, LeBlanc & Becker

[57] ABSTRACT

A permselective composite membrane comprising a porous support of a polysulfone or a polyether sulfone in combination with an ultrathin film of a defined polyacetylene whereby an interfacial layer is formed between the support and ultrathin film by the combination of the polysulfone or polyether sulfone and the polyacetylene and facilitates a gas permeability and a separation ratio of an intended gas and a useless gas. The ultrathin film may be covered with another ultrathin film of a different polymer. The interfacial layer made of phthalocyanine or its coordination compound may be provided between the support and the first-mentioned ultrathin film. In this case, various materials for the support and the first-mentioned ultrathin film may be used.

12 Claims, 1 Drawing Sheet

10

10

PERMSELECTIVE COMPOSITE MEMBRANE HAVING IMPROVED GAS PERMEABILITY AND SELECTIVITY

This application is a continuation of application Ser. No. 07/269,172, filed Nov. 9, 1988, now abandoned.

BACKGROUND OF THE INVENTION

1. Field of the Invention

This invention relates to a selective gas-permeable composite membrane suitable for use in gas separation. When the composite membrane is used, intended gas, such as an oxygen gas, can be selectively separated from mixtures.

2. Description of the Prior Art

In recent years, many techniques for separating an intended gas from a gas mixture for concentration have been in use. For instance, several types of separation membranes have been employed for concentration of oxygen from air, for separation and concentration of hydrogen for industrial applications and for recovery of carbon dioxide. Oxygen enriching membranes which are especially used to concentrate oxygen in air have wide utility in various industrial fields.

Currently employed oxygen-enriching membranes which are used to treat the air are, in most cases, made of polyorganosiloxanes. The inherent oxygen permeability of the organopolysiloxane membranes is generally in the order of $10^{-1}$ cc/cm$^2$·sec·atm. Although this type of membrane has relatively high gas permeability, the separation ratio between oxygen and nitrogen is relative small, i.e., up to 2, so that the oxygen concentration in final enriched air is up to about 30%.

Another type of oxygen-enriching membrane is known for its application in medical services. In this case, the separation ratio between oxygen and nitrogen in air is about 3~4 and the resultant enriched air contains approximately 40% of oxygen. However, this membrane can treat only a small amount of a gas mixture. For instance, with polyolefin films, the permeability of oxygen is as small as $10^{-2}$~$10^{-3}$ cc/cm$^2$·sec·atm. Wide utility has been expected for a membrane which has a large permeation rate and high selectivity. Thus, there is a strong demand for the development of high performance membranes.

SUMMARY OF THE INVENTION

It is accordingly an object of the invention to provide a permselective composite membrane which is useful in separating an intended gas from a gas mixture at higher gas permeability and higher selectivity to the gas than known membranes.

It is another object of the invention to provide a permselective composite membrane which has high stability in practical applications.

It is a further object of the invention to provide a permselective composite membrane which is made of a combination of ultrathin films each consisting of a selected polymer.

It is a still further object of the invention to provide a permselective composite membrane which is useful for separating oxygen from air.

In accordance with one embodiment of the invention, there is provided a permselective composite membrane which comprises:

a porous support made of a polymer selected from the group consisting of an aromatic polysulfone having recurring units of the formula (1) and an organic polyether sulfone having recurring units of the formula (2)

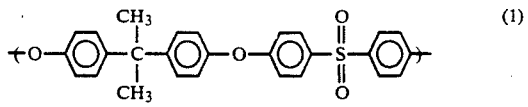

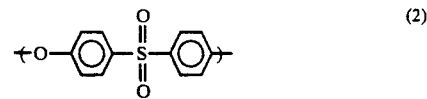

and a ultrathin film of a polymer selected from the group consisting of polyacetylenes having recurring units of the general formula (3) and (4), respectively,

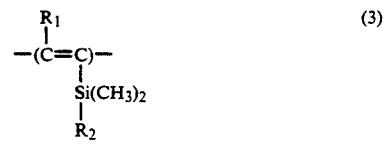

In the formula (3), $R_1$ represents a hydrogen atom or an alkyl group having from 1 to 4 carbon atoms, and $R_2$ represents —(CH$_2$)$_m$—CH$_3$ wherein m represents an integer of from 0 to 3. In the formula (4), $R_3$ represents a halogen atom, a hydrogen atom or an alkyl group having from 1 to 4 carbon atoms, and $R_4$ represents a phenyl group or an alkyl group having from 3 to 6 carbon atoms.

The composite membrane of this embodiment may further comprise a ultrathin film of a polymer formed on the first-mentioned ultrathin film and having an oxygen permeability constant of not less than $10^{-8}$ cc·cm/cm$^2$·sec·cmHg.

In accordance with another embodiment of the invention, there is also provided a permselective composite membrane which comprises a porous support, a layer of a compound selected from the group consisting of phthalocyanine, phthalocyanine complexes and phthalocyanine coordination compounds, and an ultrathin thin film of a glassy polymer having a glass transition temperature of not lower than 200° C.

It will be noted that the term "porous" used herein has a meaning set forth in "Techniques of Chemistry", Vol. VII, titled Membranes in Separation by Hwang and Kammermeyer, Wiley-Interscience Publication.

BRIEF DESCRIPTION OF THE INVENTION

PREFERRED EMBODIMENTS OF THE INVENTION

Figure 1:
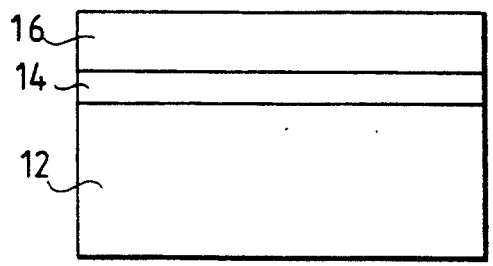
FIG. 1 is a schematic side view showing one embodiment of the invention.
Figure 2:
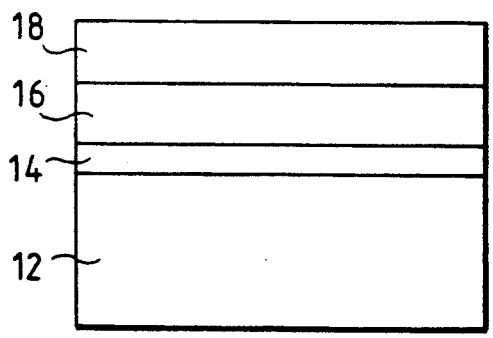
FIG. 2 is a schematic side view showing further embodiments of the invention.

Reference is now made to FIGS. 1 and 2 in which like reference numerals indicate like parts or members. In the figures, there is generally shown a permselective composite membrane 10. In the first embodiment of the invention, the permselective composite membrane 10 comprises a porous support 12 and a ultrathin film 16 formed on the porous support. Reference numeral 14 is an interface layer which will be described hereinafter. The porous support 12 and the ultrathin film 16 are first described. The porous support 12 is made of an aromatic polysulfone having recurring units of the formula (1) or an aromatic polyether sulfone having recurring units of the formula (2)

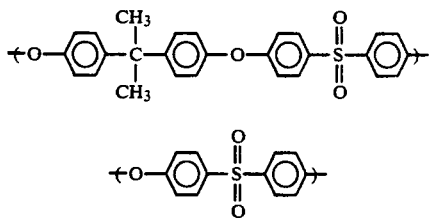

This porous support 12 is usually in the form of a film. The film may be made by various methods including an extraction method, a phase separation method, an extrusion method and the like. Although not critical, the thickness of the support film should preferably be in the range of from 10 to 300 micrometers in order to impart sufficient mechanical strength to the composite film. The aromatic polysulfone and polyether sulfone should preferably have a degree of polymerization of from 40 to 400 in view of the ease in workability and the mechanical strength.

The ultrathin layer or film 16 formed on the porous support is made of a polyacetylene having recurring units of the formula (3) or (4)

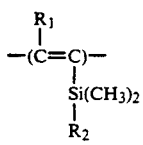

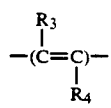

In the formula (3), $R_1$ represents a hydrogen atom or an alkyl group having from 1 to 4 carbon atoms, and $R_2$ represents —$(CH_2)_m$—$CH_3$ wherein m represents an integer of from 0 to 3. In the formula (4), $R_3$ represents a halogen atom, a hydrogen atom or an alkyl group having from 1 to 4 carbon atoms, and $R_4$ represents a phenyl group or an alkyl group having from 3 to 6 carbon atoms. Specific examples of the polyacetylene include:

poly[1-(trimethylsilyl)-1-propyne],
poly[1-(dimethylethylsilyl)-1-propyne],
poly[1-(dimethylpropylsilyl)-1-propyne],
poly[1-(dimethylbutylsilyl)1-propyne],
poly[1-(trimethylsilyl)-1-butyne],
poly[1-(trimethylsilyl)-1-pentyne],
poly(1-chloro-2-phenylacetylene), poly(tert-butylacetylene) and the like.

The ultrathin film 16 can be formed on the porous support by a method in which a dilute solution of a polymer of the formula (3) or (4) is dropped onto a surface of a liquid such as water whereupon the polymer solution is spontaneously spread over the surface. The spread solution is allowed to stand to evaporate the solvent. This ultrathin film is taken out and pressed on the support. Alternatively, the ultrathin film may be dipped up with the support to form a composite membrane. By this, the ultrathin film having a thickness of from 50 to 3000 angstroms can be formed on the support. The solvents useful for this purpose include aromatic hydrocarbons such as benzene, toluene, xylene and the like, aliphatic hydrocarbons such as n-hexane, and halogenated hydrocarbons such as dichloromethane, chloroform, 1,2-dichloroethane and the like.

When the above procedure is repeated, a desired number of the ultrathin film layers can be formed. In the practice of the invention, only one layer is sufficient for the gas separation, but up to 3 layers may be superposed, if necessary, without a sacrifice of desired characteristics.

In order to impart stability or durability to the composite membrane, the polyacetylene ultrathin film is preferably covered with another type of polymer in the form of a ultrathin film indicated as 18 in FIG. 2. This second ultrathin film 18 is formed of polyorganosiloxanes, and block, graft, crosslinkage-type copolymers mainly composed of organosiloxane units. The polyorganosiloxanes are those having recurring units of the following formula

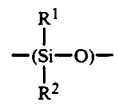

wherein $R^1$ and $R^2$ independently represent a lower alkyl group such as a methyl group, an ethyl group, a propyl group or the like, or a phenyl group. The block, graft and crosslinkage-type copolymers include those copolymers of dimethylsilicone and copolymerizable monomers, oligomers or prepolymers capable of forming block or graft-copolymerized or crosslinkable units in final copolymer products. Examples of such copolymerizable monomers, oligomers or prepolymers include those of sulfones, hydroxystyrene, phenols and the like. The monomers, oligomers or prepolymers may be used singly or in combination. These polymers or copolymers are formed as a ultrathin thin film in a manner similar to the polyacetylene ultrathin film by dissolving the polymer in a solvent and dropped over a liquid surface, followed by taking up by the first-mentioned ultrathin film formed on the porous support.

The composite membrane according to this embodiment with or without the second ultrathin film exhibits a very high gas permeability with a high oxygen gas selectivity. For instance, a composite membrane, which is composed of a polysulfone used as a 50 micrometer thick film, poly[1-(trimethylsilyl)-1-propyne] (PMSP) as a first film formed on the support, and a dimethylsiloxane-hydroxystyrenesulfone copolymer used as a second film formed on the first film, has a permeability of about 0.6 $cc/cm^2 \cdot sec \cdot atm$ with a ratio in permeability constant of oxygen and nitrogen being about 2.7. It is important to note that this composite membrane is higher in the ratio than the films of the respective materials. More particularly, the PMSP has a ratio in permeability constant of about 1.6 and the copolymer has a ratio of about 2.1. The ratio in permeability constant of the porous support is substantially zero and is thus negligible. Therefore, all the materials exhibit smaller ratios than the ratio of the composite membrane.

Then, we have made a series of experiments on the assumption that an interfacial layer indicated as 14 in the figures would be formed between the first ultrathin layer 16 and the support layer 12. The existence of the interfacial layer in a composite membrane model has been confirmed. This is particularly described in Example 2. The presence of this interfacial layer is reflected on the characteristics of the composite membrane including a selectivity to an intended gas and a gas permeability. The interfacial layer is considered due to the specific combination of a selected polymer used as the porous support and a defined polyacetylene material used as the first ultrathin film. It will be noted that the interfacial layer can be formed, without resorting to any specific techniques, by the method described hereinbefore. It will also be noted that the second ultrathin layer is substantially irrelevant to the membrane characteristics and serves to mainly stabilize the characteristics.

In the first embodiment, the interfacial layer is considered to exist between the support 12 and the first ultrathin film 16. In the second embodiment, the interfacial layer 14 is positively provided between the porous support 12 and the first ultrathin film 16. The arrangements of the composite membrane are the same as those illustrated in FIGS. 1 and 2, but the materials for the respective films or layers cover not only the materials used in the first embodiment, but also different materials which are not used in the first embodiment. This is particularly described below.

The interfacial layer 14 provided in this embodiment is made of phthalocyanine, phthalocyanine complexes or phthalocyanine coordination compounds. The phthalocyanine complexes include metallo-phthalocyanines such as Fe, Cu, Ni and Co phthalocyanines. The coordination compounds useful in the present invention includes, for example, those phthalocyanine compounds which contain, as a ligand, compounds having an amino group, e.g. amides, imides, amines and heterocyclic amines. Of these, secondary amines having from 1 to 5 carbon atoms and heterocyclic amines such as pyridine are preferred as the ligand. Alternatively, the phthalocyanine coordination compounds having as the ligand compounds containing an alkoxy group, a hydroxyl group, a nitrile group and a phosphino group may also be used. Of these, compounds having a nitrile group are preferred because of the ease in the coordination. The interfacial layer 14 is formed on a porous support 12 as shown in FIGS. 1 and 2. The formation of the interfacial layer 12 may be effected by any known methods including a vacuum deposition method, a dipping method, an Langmuir-Blodgett method and the like. This interfacial layer should preferably be in the range of from 10 to 2000 angstroms in thickness.

The interfacial layer 12 is provided between the porous support 12 and a first ultrathin film 16. In this embodiment wherein the interfacial layer is formed, the porous support is in the form of a film having a thickness of from 50 to 300 micrometers. The support may be made of a variety of materials including not only polysulfones and polyether sulfones, but also cellulose materials such as cellulose acetate, fluororesins such as polytetrafluoroethylene, polyolefins such as polypropylene, polyethylene and the like, polycarbonates, and the like. In some cases, non-woven fabric sheets may be used. Of these, polysulfones of the formula (1) and polyether sulfones of the formula (2) defined with respect to the first embodiment are preferred. The porous support 12 used in the first embodiment may also be employed in this embodiment in a similar manner.

The ultrathin film 16 of this embodiment is made of a glassy polymer having a transition temperature of not lower than 200° C. Examples of the polymer include a polyacetylene of the following general formula

wherein $R_5$ represents a hydrogen atom, an alkyl group having from 1 to 5 carbon atoms or a halogen atom such as chlorine, bromine or iodine, and $R_6$ represents an alkyl group having from 1 to 20 carbon atoms,

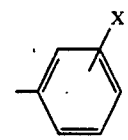

wherein x represents a hydrogen atom, an alkyl group having from 1 to 3 carbon atoms or a halogen atom, or

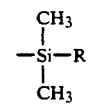

in which R represents an alkyl group having from 1 to 3 carbon atoms. In addition, polyphenylene oxide and polyfumaric esters are likewise used in the practice of the invention. In the above formula (5), it is preferred that $R_5$ is a methyl group and $R_6$ is a trimethylsilyl group. These polymers can be formed into an ultrathin film by the method described with regard to the first embodiment. For instance, a dilute solution of the polymer selected from the above polymers is prepared and dropped over a water surface followed by removing the solvent. The ultrathin film should preferably have a thickness of from 50 to 3000 angstroms. For the formation of the ultrathin film on the interfacial layer, the ultrathin film is deposited on the interfacial layer formed on the support.

The ultrathin film 16 may be further covered with a second ultrathin film 18 as in the case of the first embodiment. This thin film 18 is the same as described in the first embodiment and is not described herein.

The present invention is more particularly described by way of examples.

EXAMPLE 1

A polyether sulfone film having a thickness of 50 micrometers (Ko-2 type, available from Toyo Cloth Co., Ltd.) was provided for use as a porous support. Poly[1-(trimethylsilyl)-1-propyne] (PMSP) used to make a first ultrathin film was dissolved in benzene at a concentration of 1 wt %. The dilute solution for the first ultrathin film was dropped over a water surface and deposited on the support in a thickness of 200 angstroms to obtain a composite membrane having the first ultrathin layer. For checking the influence of the thickness of the first ultrathin film on the characteristics, composite membranes having the first ultrathin films composed of 2, 4, 6, 10 and 16 layers were made, respectively.

These composite membranes were each subjected to measurement of an oxygen permeability using a permeability tester and a separation ratio between oxygen and nitrogen. Moreover, the oxygen permeability after the membranes had been allowed to stand for 100 hours was measured. The results are shown in Table 1 below.

TABLE 1

| Number of Layers | Oxygen Permeability (cc/cm² · sec · atm) | Separation Ratio (FO₂/FN₂) | Oxygen Permeability After Standing for 100 hours (cc/cm² · sec · atm) |
| --- | --- | --- | --- |
| 2 | 0.67 | 2.62 | 0.31 |
| 4 | 0.58 | 2.63 | 0.32 |
| 6 | 0.57 | 2.58 | 0.36 |
| 10 | 0.50 | 2.41 | 0.28 |
| 16 | 0.42 | 2.29 | 0.24 |

The results of the above table reveal that as the number of the layers increases, the oxygen permeability decreases. The separation ratio shows a similar tendency as the oxygen permeability. In addition, the oxygen permeability after 100 hours is not so high.

EXAMPLE 2

The general procedure of Example 1 was repeated except that a second ultrathin layer was formed in a thickness of 200 angstroms using a crosslinkage-type hydroxystyrene-sulfone-dimethylsiloxane terpolymer having a siloxane content of not larger than 70% (HS) and the second ultrathin film was formed on the first ultrathin film. The first ultrathin films were made of 1, 2, 4, 6, 8 and 10 layers, respectively. The resultant composite membranes were subjected to the measurement similar to Example 1. The results are shown in Table 2 below.

TABLE 2

| Number of Layers | Oxygen Permeability (cc/cm² · sec · atm) | Separation Ratio (FO₂/FN₂) | Oxygen Permeability After Standing for 500 hours (cc/cm² · sec · atm) |
| --- | --- | --- | --- |
| 1 | 0.63 | 2.71 | 0.60 |
| 2 | 0.60 | 2.68 | 0.59 |
| 4 | 0.60 | 2.65 | 0.55 |
| 6 | 0.57 | 2.58 | 0.47 |
| 8 | 0.55 | 2.50 | 0.40 |
| 10 | 0.50 | 2.43 | 0.31 |

The results of the Table 2 reveal that similar to the results of Example 1, when the number of the layers of the first ultrathin film increases, the oxygen permeability and separation ratio decrease along with a decrease of the oxygen permeability after standing for 500 hours. The comparison between the results of Examples 1 and 2 demonstrate that the formation of the second ultrathin film is effective in keeping the oxygen permeability over a long term.

The reason why the oxygen permeability decreases with the increasing number of the layers of the first ultrathin film is considered as follow. The composite membrane model of the embodiment is assumed to include, as particularly shown in FIGS. 1 and 2, the interfacial layer 14 provided between the porous support 12 and the ultrathin polymer film 16 by which the high separation ratio and the high oxygen permeability are ensured. The second ultrathin polymer film 18 is provided to stabilize the first ultrathin film. In FIGS. 1 and 2, when the oxygen permeability constant and thickness of the first ultrathin film 16 are, respectively, taken as $\overline{P}_1$ and $l_1$ and the oxygen permeability constant and thickness of the interfacial layer 14 are, respectively, $\overline{P}_2$ and $l_2$, the oxygen permeability FO₂ of the composite membrane in the second ultrathin film-free condition is expressed by the following equation (1). It will be noted that the porous support 12 is not a resistant layer and is thus neglected.

$$FO_2 = A \cdot dP \left\{ \left( \frac{P_1}{l_1} \right)^{-1} + \left( \frac{P_2}{l_2} \right)^{-1} \right\}^{-1} \quad (1)$$

wherein A represents an area of the membrane and dP is a difference in pressure.

Thus, the separation ratio, $\alpha_o$ (FO₂/FN₂), is expressed by the following equation (2)

$$\alpha_0 = \frac{\alpha_2 \left( \frac{P_2}{l_2} \right)^{-1} + \alpha_1 \left( \frac{P_1}{l_1} \right)^{-1}}{\left( \frac{P_2}{l_2} \right)^{-1} + \left( \frac{P_1}{l_1} \right)^{-1}} \quad (2)$$

$$= \alpha_1 + (\alpha_2 - \alpha_1) \frac{\left( \frac{P_2}{l_2} \right)^{-1}}{\left( \frac{P_2}{l_2} \right)^{-1} + \left( \frac{P_1}{l_1} \right)^{-1}}$$

wherein $\alpha_1$ and $\alpha_2$ are, respectively, a separation ratio of the first ultrathin film 16 and the interfacial layer 14. Now, assuming that the thickness of a produced interfacial layer is constant irrespective of the number of the layers or the thickness of the first ultrathin film, the equation (1) may be written as follows $$FO_2(n) = A \cdot dP \cdot \left\{ \left( \frac{P_2}{l_2} \right)^{-1} + n \left( \frac{P_1}{l_1} \right)^{-1} \right\}^{-1} \quad (3)$$

wherein n is the number of the layers of the first ultrathin film 16. Similarly, the equation (2) is written in the form $$\alpha_0(n) = \alpha_1 + (\alpha_2 - \alpha_1) \frac{\left( \frac{P_2}{l_2} \right)^{-1}}{\left( \frac{P_2}{l_2} \right)^{-1} + n \left( \frac{P_1}{l_1} \right)^{-1}} \quad (4)$$

Further, the equation (3) gives $$\frac{A \cdot dP}{FO_2(n)} = \left( \frac{P_2}{l_2} \right)^{-1} + n \left( \frac{P_1}{l_1} \right)^{-1} \quad (5)$$

From the equation (5), it will be seen that when the interfacial layer has a constant thickness irrespective of the number of the superposed layers of the first ultrathin film, the reciprocal of FO₂ has the relationship of the linear equation with the number of the superposed layers. This relationship has been experimentally confirmed by plotting the data of Table 2. Thus, the existence of the interfacial layer has been evidenced along with the reason why the characteristics of the composite membrane have been improved. From this relationship, the values of $(\bar{P}_2/l_2)$ and $(\bar{P}_1/l_1)$ are approximately determined. When the thus determined values are inserted into the equation (4) for calculation of a separation ratio $(\alpha_2)$, a value of about 2.9 is obtained. This value is not influenced by the number of the superposed layers.

In the above examples, the PMSP was used as the first ultrathin film, and other acetylene polymers defined in the present invention showed a similar tendency.

EXAMPLE 3

A polyether sulfone film (available from Toyo Cloth Co., Ltd.) was used as a porous support, on which iron phthalocyanine heated to 430° C. under a reduced pressure of $10^{-5}$ Torr. was vacuum deposited for 3 minutes to form a layer of the iron phthalocyanine having a thickness of 300 angstroms. Thereafter, poly[1-(trimethylsilyl)-1-propyne] was used as a glassy polymer and dissolved in toluene to make a 1 wt % toluene solution. This solution was spread over an ion-exchanged water surface, thereby forming a 0.1 micrometer thick ultrathin film. This ultrathin film was deposited on the support. The resultant composite membrane was subjected to measurement of oxygen permeability. As a result, the oxygen permeability, $FO_2$, was found to be approximately $7.1 \times 10^{-1}$ cc/cm$^2$·sec·atm. The separation coefficient, $\alpha$, of oxygen/nitrogen was about 3.2.

The comparison with the results of Example 1 in which the same materials for the porous support and the first ultrathin film are used reveals that the oxygen permeability and the separation ratio are improved by the positive provision of the interfacial layer of the phthalocyanine compound.

EXAMPLE 4

The general procedure of Example 3 was repeated using as the glassy polymer polyphenylene oxide (PPO with a weight average molecular weight of about 150,000), followed by coating a polyhydrogensilane on the glass polymer surface. The resultant composite membrane was subjected to measurement of the values of $FO_2$ and $\alpha$. As a result, it was found that the oxygen permeability was $1.0 \times 10^{-1}$ cc/cm$^2$·sec·atm and the separation ration was 4.5.

The above procedure was repeated without use of the iron phthalocyanine interfacial layer. The separation ratio was as high as 4.0, but the oxygen permeability was as low as $0.6 \times 10^{-1}$ cc/cm$^2$·sec·atm.

What is claimed is:

1. A permselective composite membrane which comprises:
    a porous support made of a polymer selected from the group consisting of an aromatic polysulfone having recurring units of the formula (1) and an organic polyester sulfone having recurring units of the formula (2)

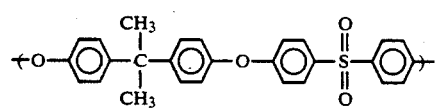

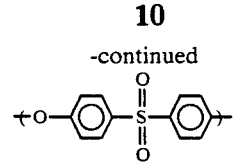

and
    a ultrathin film of a polymer selected from the group consisting of polyacetylenes having recurring units of the general formula (3) and (4), respectively,

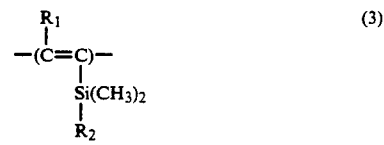

wherein $R_1$ represents a hydrogen atom or an alkyl group having from 1 to 4 carbon atoms, $R_2$ represents —(CH$_2$)$_m$—CH$_3$ wherein m represents an integer of from 0 to 3, $R_3$ represents a halogen atom, a hydrogen atom or an alkyl group having from 1 to 4 carbon atoms, and $R_4$ represents a phenyl group or an alkyl group having from 3 to 6 carbon atoms; and
    an interface layer formed between said porous support and said ultrathin film whereby gas separation is facilitated by the presence of the interface layer, said ultrathin film being deposited on said porous support by a method wherein said polymer is dissolved in a solvent, spread over the surface of water, allowed to stand to evaporate the solvent thereby forming a thin film, and the thin film is taken up by the porous support whereby said interface layer is formed between said porous support and said ultrathin film.

2. A perselective composite membrane according to claim 1, wherein said porous support is made of the aromatic polysulfone.

3. A permselective composite membrane according to claim 1, wherein said porous support is made of the aromatic polyether sulfone.

4. A permselective composite membrane according to claim 1, wherein said ultrathin film comprises one layer of of the selected polymer.

5. A permselective composite membrane according to claim 1, wherein said ultrathin film comprises up to 3 layers of the selected polymer.

6. A permselective composite membrane according to claim 1, wherein said ultrathin film is made of the polyacetylene of the formula (3).

7. A permselective composite membrane according to claim 1, wherein said ultrathin film is made of the polyacetylene of the formula (4).

8. A permselective composite membrane according to claim 7, wherein $R_3$ represents a halogen atom.

9. A permselective composite membrane according to claim 1, further comprising another ultrathin film formed on the first-mentioned ultrathin film so as to protect said first-mentioned ultrathin film, said another ultrathin film being made of a polymer having an oxygen permeability constant of not less than $10^{-8}$ cc·cm/cm$^2$·sec·cmHg.

10. A permselective composite membrane according to claim 9, wherein said polymer for the another ultrathin film is a polyorganosiloxane having units of the following general formula

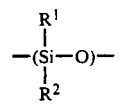

wherein $R^1$ and $R^2$ independently represent a lower alkyl group or a phenyl group.

11. A permselective composite membrane according to claim 9, wherein said polymer for the another ultrathin film is a block, graft or crosslinkage-type mainly composed of organosiloxane units.

12. A permselective composite membrane according to claim 1, wherein said support has a thickness of from 50 to 300 micrometers and said ultrathin film has a thickness of from 50 to 3000 angstroms.

* * * * *